Aug. 29, 1961 G. E. McPHERREN 2,997,751
AIRCRAFT DOOR
Filed Feb. 21, 1958 2 Sheets-Sheet 1

INVENTOR.
GLEN E. McPHERREN
BY
ATTORNEY

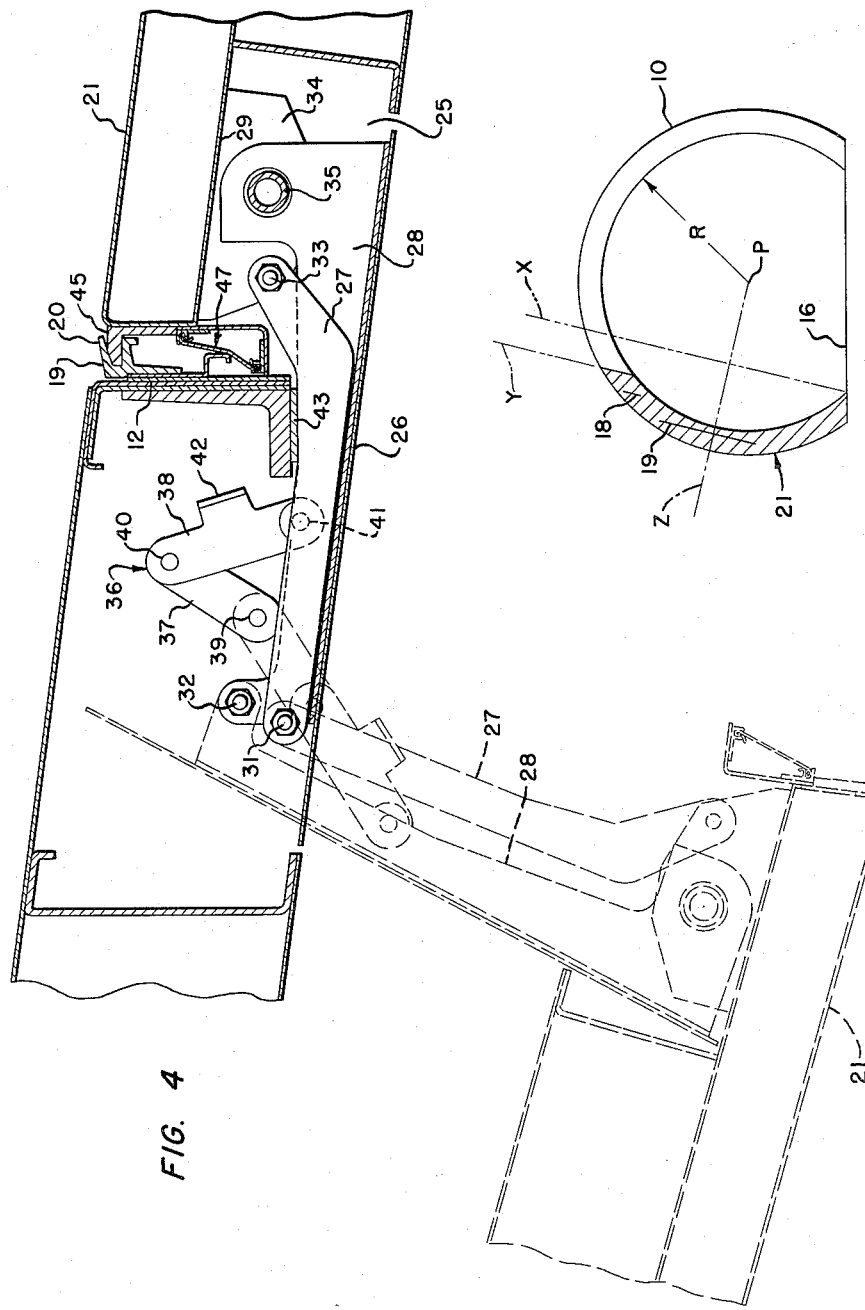

United States Patent Office 2,997,751
Patented Aug. 29, 1961

2,997,751
AIRCRAFT DOOR
Glen E. McPherren, San Diego, Calif., assignor to General Dynamics Corporation, San Diego, Calif., a corporation of Delaware
Filed Feb. 21, 1958, Ser. No. 716,587
18 Claims. (Cl. 20—16)

The present invention relates generally to closures, and more particularly to an improved form of aircraft door for use in connection with the passenger entrance to a pressurized cabin.

In order to effect greater economy and increased speed, modern aircraft are presently being flown at increasingly higher altitudes to take advantage of the lessened friction drag of the rarified air of the upper atmosphere. As higher elevations are attained however, the pressure differential between the outside air and the cabin air increases since the pressure within the cabin remains substantially the same, being maintained at a level which is comfortable and safe for the passengers. Entrance doors and service doors must be effectively sealed against leakage and accidental opening since undue leakage may tend to overbalance the output capabilities of the cabin pressurization system and result in an under-pressurized condition. In the event a door became unlatched, the entire pressure would suddenly be released whereby equipment and personnel might be forceably ejected through the door opening. An obvious solution to overcome such problems would involve opening of the door from the inside of the cabin rather than from the outside. However an inwardly opening door presents disadvantages outweighing its advantages. For example in an emergency situation such as occurs after a crash, passengers too often panic and rush to the exits in their effort to escape. An inwardly opening door in such cases would become hopelessly barred from opening as a result of the weight of the passengers jammed against it. In addition, an inwardly opening door utilizes valuable cabin space for its operation. Obviously cabin area reserved for this purpose may be more economically utilized for cargo or other useful accommodations. Further, the interior design and arrangements of the furnishings and equipment in and around the door area would also be restricted to permit proper clearance for the inwardly pivoting door. The usual outwardly opening door meets certain of these disadvantages but presents others which are equally objectionable. An outwardly pivoted door for example, is secured against opening by its associated latches and hinges. It has been found that in the event of a failure of either, the internal cabin pressure would blow the door open or completely jettison the door from the body of the airplane. Additionally a door failure may result from defective locking mechanism, worn hinges, or a partially latched door. Accordingly the present invention embodies novel features of construction which overcome the objections set forth above.

It is therefore an object of the present invention to provide a door for pressurized bodies that utilizes the internal pressure to more firmly seat the door within its surrounding opening structure.

Another object of this invention is to provide in a wall of generally arcuate cross-sectional configuration an outwardly opening pressurized door that must be first vertically elevated in order to effect unlatching thereof.

Another object of this invention is to provide an outwardly opening pressurized door embodying load bearing means cooperating with load bearing means of adjacent wall structure to prevent lateral outward movement of the door and positively and securely lock the door within its associated opening.

Another object of this invention is to provide an outwardly opening pressurized door having a tapered side converging towards the bottom thereof whereby upon movement, slidable disengagement with the door retaining members is readily effected.

Still another object of this invention lies in the novel over-center door latch linkage whereby the door is automatically locked in elevated disposition when opened and automatically locked against being inadvertently elevated when closed.

A further object of this invention is to provide an outwardly opening door which when in open position rests substantially parallel and spaced from the body to which it is hinged having the hinged edge thereof spaced from the door opening a substantial distance to provide clearance around the entire periphery of the opening structure whereby loading platforms and portable stairways may be placed within close proximity of the vehicle body without interference with the opened door.

Other objects and features of the present invention will be readily apparent to those skilled in the art from the following specification and appended drawings wherein is illustrated a preferred form of the invention, and in which:

FIGURE 4 is an enlarged sectional view through the hinge linkage taken on the line IV—IV of FIGURE 1; and FIGURE 5 is transverse sectional view illustrating the cabin and door diagrammatically.

Figure 1:
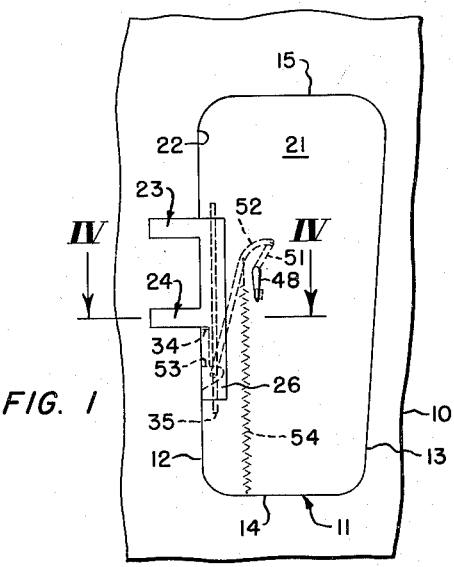
FIGURE 1 is a front elevational view of a door of the present invention shown in closed position and illustrating a fragmentary portion of an aircraft cabin.
Figure 2:
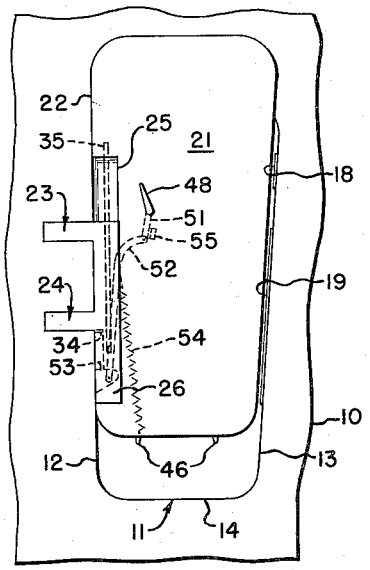
FIGURE 2 is a front elevational view of the door shown elevated and in position for hinging outwardly of the cabin opening.
Figure 3:
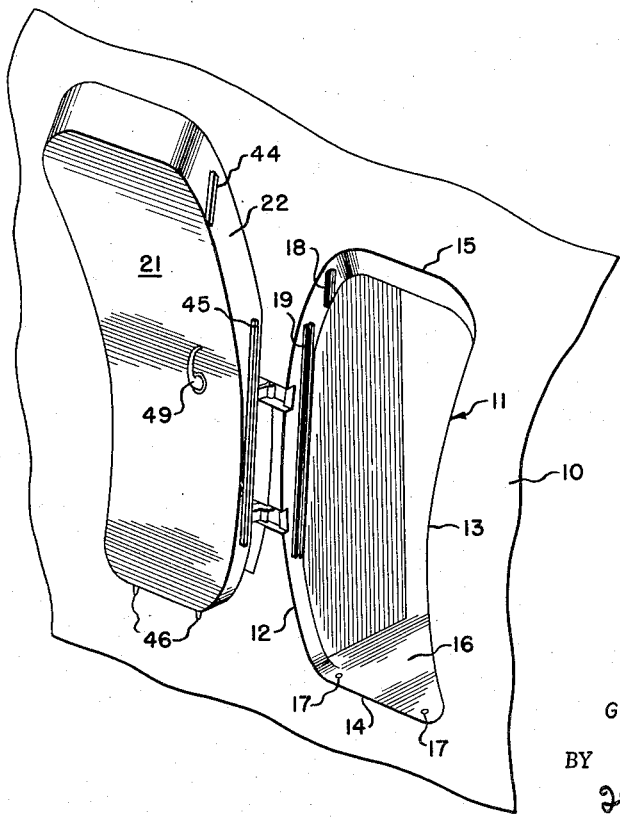
FIGURE 3 is an enlarged perspective view of the door fully opened with a fragmentary portion of the cabin illustrated.

Referring particularly to FIGURES 1, 2 and 3 of the drawings an aircraft cabin 10, only a portion of which is illustrated, is provided with a generally wedge-shape door opening 11 having a vertically disposed side 12, an angularly disposed side 13 slanting towards a sill 14, and a lintel 15. Sill 14 is coplanar with the floor 16 of cabin 10 and is provided with a plurality of load bearing pin openings 17 for a purpose to be later described. Secured to and projecting from each of the sides 12 and 13 are a pair of load bearing members 18 and 19 having jaw portions 20, lower load bearing member 19 being substantially greater in length than upper load bearing member 18 though both are alike in cross-sectional configuration. As shown diagrammatically in FIGURE 5, load bearing members 18 and 19 are parallel with one another and are upwardly inclined with respect to the centerline of cabin 10.

A door 21 is positioned within door opening 11, the outline configuration of which corresponds to the door opening configuration and the cross-sectional configuration conforming to the cross-sectional configuration of cabin 10 whereby the exterior of the door will fair into the external surface of the aircraft fuselage when the door is closed to effect a smooth continuation of the fuselage.

Door 21, at its side 22, is hinged to cabin 10 at side 12 of the door opening by means of an upper hinge assembly 23 and a lower hinge-assembly 24. The location of these hinge assemblies 23 and 24 are fixed relative to the cabin, but door 21, as will be hereinafter fully described, is movable upwardly with respect to such assemblies, this upward door movement preceding outward swinging of the door to final open position. However, by reason of the longitudinal curvature of the door and the dimensions of the hinge assemblies, the assemblies would ordinarily be struck by curved portions of the door thereby preventing the desired upward door opening. To obviate this undesirable striking, a clearance opening 25 is provided, which opening is cut into the front face of door 21 at side 12 of the door in the area of the hinge assemblies.

Clearance opening 25 will be closed by a fairing 26 which is fixedly mounted on lower hinge assembly 24 and rotates therewith. Fairing 26 is of the same outline configuration as opening 25 and fits thereinto when door 21 is in closed position to provide door surface continuity.

Since upper and lower hinge assemblies 23 and 24 are of the same construction a description of lower hinge assembly 24 only will be provided. The particular structural details of cabin 10 and door 21 are of no concern to the present invention and, accordingly, such details will not be described.

Hinge assembly 24 comprises a pair of arms 27 and 28 each pivotally secured at one of their ends to suitable fixed structure of cabin 10 by bolts 31 and 32 respectively. The opposite end of arm 27 is pivotally secured as by a bolt 33 to a bracket 34 which is slidably connected to a vertically disposed rod member 35 to permit lengthwise movement of the rod 35 relative to bracket 34. An edge 29 of bracket 34 slidably engages the structure of door 21 in order to prevent pivoting of bracket 34 about rod 35 during opening of door 21. The opposite end of arm 28 pivots about rod member 35 and is also slidably connected thereto, rod member 35 extending through an aperture in the end of arm 28. Rod member 35 is suitably fixed at both of its ends to the internal structure of the door 21, with the upper end being fixed at a point spaced above the upper hinge assembly 23 and with the lower end being fixedly anchored to the door structure at a point spaced below lower hinge assembly 24. Rod member 35 thus moves with the door 21 and, in effect, acts as a hinge pin about which both of the hinge assemblies 23 and 24 pivot. Also since the connections between the elements of the hinge assemblies and the rod member is of slidable nature rectilinear movement of the rod relative to the hinge assemblies is available to permit the required rectilinear bodily movement of the door 21 in a vertical plane in its original opening and in its final closing movements as will be later fully described.

Door 21 is effectively prevented from striking against the side of the cabin when in open position or from accidentally returning to closed position by a hold-open member 36 comprising a pair of links 37 and 38. Link 37 is pivotally connected at one end to suitable cabin structure as by a bolt 39 and has its opposite end hinged to one end of link 38 by a bolt 40. Link 38 is pivotally connected at its other end to arm 28 by a bolt 41. When door 21 is swung to its fully open position links are drawn to an extended in-line position wherein they restrain inadvertent movements of the door. The lengths of links 37 and 38, obviously, are of such dimension that they prevent the door from slamming against the side of the airplane when the door is rotated to open position. A finger tab 42 extending from link 38 provides a means for manual grasping of link 38 in order to rotate hinge pin 40 about the axis of bolt 41 to break the in-line location of links 37 and 38 when it is desired to close door 21.

Fixedly secured to the interior side of the structure of side 12 of door opening 11 is a bumper pad 43 which cooperates with hinge arm 27 in the closing movement of the door 21 as will be fully described hereinafter.

A pair of generally L-shaped lugs 44 and 45 are secured to and extend from each of the lateral sides of door 21 to mate with the jaw-like portions 20 of load bearing members 18 and 19 respectively provided at the door opening sides 12 and 13 to serve as restraining means against lateral outward movement of the door 21 when door 21 is in closed position. FIGURE 4 illustrates the mating of lug 45 with load bearing member 19 and shows the cross-section configuration of these members. It is understood that the other lug 44 is of the same cross-sectional configuration as lug 45 and load bearing member 18 also conforms in cross-section to load bearing member 19. If additional restraining means are desired pins 46 may be provided at the lower edge structure of door 21 for extension into and mating with pin openings 17 in sill 14. Lugs 44 and 45 together with pins 46 when engaged with their respective mating members and openings effectively secure door 21 against accidental lateral outward displacement when subjected to the internal forces created by the pressurization of cabin 10.

Door 21 is preferably sealed against pressure leaks between door 21 and door opening 11 by a diaphragm and jamb type sealing arrangement generally designated by the numeral 47. A complete and detailed description of such a seal may be had by reference to U.S. Patent No. 2,665,459. It is to be emphasized however, that the particular type of seal used for this purpose is not to be construed as a part of the present invention but that sealing arrangement 41 is merely exemplary of a seal adapted for use with door 21.

Referring again to FIGURES 1, 2, and 3, an exterior door handle 48 appropriately located on the door 21 connects with an interior handle 49 through a usual spindle (not shown) which provides a radially extending arm 51 which is located within the interior of door 21. Arm 51 rotates in common with handles 48 and 49 and is pivotally connected at the extended end thereof to the end of the short leg of a substantially L-shaped locking and actuating member 52, the end of the longer leg of member 52 being suitably pivotally connected to a suitable bracket means 53 which is secured to bracket 34 of the lower hinge assembly 24. A tension spring 54 is secured at one of its ends to L-shaped member 52 at an intermediate point and is secured at its other end to suitable internal structure. Tension spring 54 exerts its bias to assist in the elevating movement of door 21 and also serves to substantially balance the weight of door 21 when the door 21 is in its elevated position as shown in FIGURE 2.

Tension spring 54, spindle arm 51, bracket means 53, the L-shaped member 52 and the handles 48 and 49 are so located that the bias of spring 54 serves to maintain the handles in door-closed, or downwardly extending position, when occupying such position, and in door-open or upwardly extending position, after the handles have been moved to such position. When the door is closed the pivotal connection of spindle arm 51 to the upper end of L-shaped member 51 will lie below (as viewed in FIGURE 1) a line extending through the pivotal axis of the handles and through the pivotal axis of the connection of the lower end of L-shaped member 51 to bracket 53. Therefore, when the door 21 is closed the bias of spring 54 acts in door-closing direction on the handles to maintain them closed. It will be necessary to exert manual rotative force in door-opening direction on the handles to shift the position of the pivotal connection of spindle arm 51 to member 52 to the other side of this line before the bias of the spring acts to assist in upward movement of the door.

When the door is in elevated position and the handles 48 and 49 are in door-open position, then again by reason of the geometry of the parts, the pivotal connection of spindle arm 51 to the upper end of L-shaped member 51 will lie below the above described line of intersection and the bias of tension spring 54 will be exerted to act on the handles for continued rotation of the handles for door-opening direction.

To limit the amount of counter-clockwise rotational movement of handles 48 and 49 and assure that they do not move beyond door-open position, which as shown in FIGURE 2, is a vertical position wherein the handles are upwardly pointed, there is provided a stop 55 which is engageable by spindle arm 51. Stop 55 is secured to the internal structure of door 21 at an appropriate position below the rotatable handles 48 and 49 in the path of rotation of spindle arm 51.

Door 21 in moving from closed to open position first moves with a straight-line movement upwardly. The upward movement is required to withdraw pins 46 at the bottom of the door from openings 17 and to horizontally space lugs 44 and 45 at the slanting side of the door away from their associated load bearing members 18 and 19 at side 13 of the door opening. It is apparent that if lugs 44 and 45 at the slanting side of the door are not moved to a position clear of the jaw portions 20 of load bearing members 18 and 19 they would interfere with swinging movement of door 21 upon the hinge assemblies 23 and 24. FIGURE 2 illustrates the upward position of door 21 wherein lugs 44 and 45 at the slanting side of the door are spaced horizontally away from load bearing members 18 and 19.

Load bearing members 18 and 19, as shown in FIGURE 5, are parallel and inclined to the center-line of the cabin and, accordingly, the straight-line upward movement of the door 21 will be similarly inclined. In FIGURE 5, line $x$ indicates the straight line along which the lowermost interior edge of the door 21 will travel and line $y$ indicates the straight line along which the upper edge of the door travels. These lines of travel are parallel to one another and to the load bearing members 18 and 19.

In connection with FIGURE 5, it will now be explained how the interior pressure of the cabin exerts its force on the interior surface of the door 21 to maintain it in closed position. In FIGURE 5 there is shown a line $z$ which is normal to line $x$ and extends from the center point P of the arc which describes the interior cross-sectional configuration of cabin 10. Point P is, of course, at the radial distance R from the interior surface of the cabin and from the interior surface of the door. Line $z$ defines a neutral axis since cabin pressure acting along this line will tend neither to elevate nor to hold down door 21. However, pressure below line $z$ effects a downward force on door 21 while the pressure above exerts an upward force. Now since the door 21 is designed to afford a greater surface area below line $z$ than above, as is apparent from FIGURE 5, there will be a pressure differential which acts upon the door to hold it in its closed position. Obviously, this holding force is a desirable safety feature and serves to retain the door in its closed position even though there might be failure in the locking mechanism of the door.

As shown in FIGURES 1 and 2 of the drawings, door 21 is substantially wedge-shaped, being wider at the lintel 15 than at the sill 14. However, door 21 is so constructed and designed that even with its wedge-shaped configuration there will be a greater area of door 21 presented below line $z$ than above it so that the effective interior pressure on the door is exerted in door closing direction as above described.

The operation of door 21 will now be described.

Assuming it is desired to move the door 21 from closed to open position, manual rotation is effected of either of the handles 48 or 49, which as stated are interconnected by a usual spindle. This will rotate spindle arm 51 to apply a force to L-shaped member 52 which is pivotally connected at one end to arm 51. Member 52 being pivotally connected at its opposite end to the bracket 34 of lower hinge assembly 24 will cause this force to push door 21 upwardly. In this movement, rod member 35 also moves upwardly since it is freely slidable within apertures in arms 28 and brackets 34 of hinge assemblies 23 and 24. This upward movement continues until pins 46 are withdrawn from openings 17 and lugs 44 and 45 are clear, in a horizontal direction, of their associated load bearing members 18 and 19 at side 13 of door opening 11 and spindle arm 51 engages stop 55. Tension spring 54 exerts its force to assist in this upward movement of the door whereby the amount of manual force required is substantially reduced.

After door 21 is in its elevated position it is free to swing outwardly of door opening 11. In this swinging movement door 21 first rotates about the axis of rod member 35 and about bolt 33 to effect withdrawal of lugs 44 and 45 from jaws 20 of load bearing members 18 and 19 at side 12 of door opening 11. Door 21 is then rotated on arms 27 and 28 to full open position, the arms 27 and 28 pivoting about their respective bolts 31 and 32. In this movement links 37 and 38 are drawn into alignment to limit the extent of movement of the door and to lock it in open position after such position is reached. The relationship of door 21, in its open position, relative to door opening 11 affords ample clearance therearound for ready placement of service platforms and stairways adjacent cabin 10 without likelihood of damage to the door.

Closing of door 21 is accomplished by pulling finger tab 42 of link 38 to initiate jackknifing of links 37 and 38 whereupon door 21 may be pulled by a handle to swing upon its hinges to its elevated position in door opening 11 and thereafter it is lowered into its final position in door opening 11. In the swinging movement of door 21 toward the door opening 11 the arms 27 of the hinge assemblies 23 and 24 will strike against their associated bumper pads 43. Thereafter the continued swinging movement is about rod 35 and bolt 33 to effect nesting of lugs 44 and 45 into jaws 20 of load bearing members 18 and 19 at side 12 of the door opening. Nesting of lugs 44 and 45 at the opposite side of the door with their associated load bearing members 18 and 19 is accomplished when door 21 is lowered. The nesting of these lugs within their load bearing members results in a door structure which is capable of accepting internal pressure loads of considerable magnitude.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What I claim is:

1. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, and cooperating restraining means on said door and said wall structure for preventing lateral outward movement of said door when in closed position, said hinge means supporting said door, in its movement from closed to open position, first for rectilinear movement relative to said wall structure for release of said restraining means and thereafter for swinging movement outwardly of said entrance opening.

2. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, and holding means at the upright side edges of said door cooperating with holding means on said wall structure at opposite sides of said entrance opening for restraining said door against lateral outward movement when in closed position, said holding means on said door being rectilinearly displaced relative to said holding means on said wall structure on rectilinear movement of said door to release said door from the restraint of said holding means, said hinge means supporting said door in its rectilinear movement to released position and thereafter supporting said door for swinging movement outwardly to one side of said entrance opening.

3. In combination with the wall structure of a pressurized aircraft cabin which has an entrance opening therein, said wall structure having a generally arcuate cross-sectional configuration, a rectilinearly movable door swingable about its rectilinear axis for closing said entrance opening, said door corresponding in cross-sectional configuration to that of said wall structure and being of substantially wedge shape in peripheral outline, said door having the upper edge surface thereof disposed in parallel relationship with said rectilinear axis of said door, said entrance opening corresponding in peripheral outline to said peripheral outline of said door, hinge means pivotally and slidably connecting said door with said wall structure, interengageable means on said door and said wall structure for restraining said door against lateral outward movement when in closed position, and means for rectilinearly moving said door to a position relative to said wall structure wherein said door is released from the restraint of said holding means, said hinge means supporting said door in its rectilinear movement to released position and thereafter supporting said door for swinging movement outwardly to one side of said entrance opening.

4. In combination with the wall structure of a pressurized aircraft cabin which has an entrance opening therein, said wall structure having a generally arcuate cross-sectional configuration, said entrance opening being defined by a sill, a lintel, a generally vertical side and a spaced, angularly disposed side slanting toward said sill, a rectilinearly movable door swingable about its rectilinear axis for closing said entrance opening, said door corresponding in size and peripheral outline to the peripheral outline of said entrance opening and conforming in cross-sectional configuration to that of said wall structure, said door having the upper edge surface thereof disposed in parallel relationship with said rectilinear axis of said door, hinge means pivotally and slidably connecting said door with said wall structure adjacent said vertical side, load bearing means on said spaced sides engageable with lug means on opposite sides of said door and acting to restrain said door against lateral outward movement when in closed position, and means for rectilinearly moving said door relative to said wall structure to a position wherein the engaged load bearing and lug means at said slanting side are spaced apart, said hinge means supporting said door in said rectilinear movement and thereafter supporting said door for swinging movement outwardly to one side of said entrance opening.

5. In combination with the wall structure of a pressurized aircraft cabin which has an entrance opening therein, said wall structure having a generally arcuate cross-sectional configuration, said entrance opening being defined by a sill, a lintel, a generally vertical side and a spaced, angularly disposed side slanting toward said sill, a rectilinearly movable door swingable about its rectilinear axis for closing said entrance opening, said door corresponding in size and peripheral outline to the peripheral outline of said entrance opening and conforming in cross-sectional configuration to that of said wall structure, said door having the upper edge surface thereof disposed in parallel relationship with said rectilinear axis of said door, hinge means pivotally and slidably connecting said door with said wall structure adjacent said vertical side, pin means on the base of said door disposable in openings provided in said sill, load bearing means on said spaced sides engageable with lug means on opposite sides of said door, said pin means and said load bearing and lug means of said sides and door serving to restrain said door against lateral outward movement when the door is in closed position, and means for rectilinearly moving said door relative to said wall structure to a position wherein the engaged load bearing and lug means at said slanting side are spaced apart, said hinge means supporting said door in said rectilinear movement and thereafter supporting said door for swinging movement outwardly to one side of said entrance opening.

6. In combination with the wall structure of a pressurized aircraft cabin which has an entrance opening, said wall structure having a generally arcuate cross-sectional configuration, said entrance opening in said wall structure having a substantially wedge-shaped peripheral outline, a door corresponding in peripheral outline to said entrance opening and conforming in cross-sectional configuration to that of said wall structure, said door having its upper edge surface lying in a substantially vertical plane, hinge pin means fixedly carried by said door, hinge means carried by said wall structure in fixed position relative to said wall structure and having a pivotal and slidable connection with said hinge pin means, and cooperating restraining means on said door and said wall structure for preventing lateral outward movement of said door when in closed position, said hinge means supporting said door, in its movement from closed to open position, first for slidable movement of the door upon said hinge pin means for release of said restraining means and thereafter for swinging movement outwardly of said entrance opening.

7. In combination with the wall structure of a pressurized aircraft cabin which has an entrance opening, said wall structure having a generally arcuate cross-sectional configuration, said entrance opening in said wall structure having a substantially wedge-shaped peripheral outline, a door corresponding in peripheral outline to said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, and cooperating restraining means on said door and said wall structure for preventing lateral outward movement of said door when in closed position, said hinge means supporting said door, in its movement from closed to open position, first for slidable movement of the door upon said hinge pin means for release of said restraining means and thereafter for swinging movement outwardly of said entrance opening.

8. In combination with the wall structure of a pressurized aircraft cabin which has an entrance opening, said wall structure having a generally arcuate cross-sectional configuration, said entrance opening in said wall structure having a substantially wedge-shaped peripheral outline, a door corresponding in peripheral outline to said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, holding means at the upright side edges of said door cooperating with holding means on said wall structure at opposite sides of said entrance opening for restraining said door against lateral outward movement when in closed position, and means for moving said door rectilinearly on said hinge pin means and relative to said wall structure to a position where said door is released from the restraint of said holding means, said hinge means supporting said door in its rectilinear movement upon said hinge pin means to released position and thereafter supporting said door for swinging movement outwardly to open position at one side of said entrance opening.

9. In combination with the wall structure of a pressurized aircraft cabin which has an entrance opening, said wall structure having a generally arcuate cross-sectional configuration, said entrance opening in said wall structure having a substantially wedge-shaped peripheral outline, a door corresponding in peripheral outline to said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, holding means at the upright side edges of said door cooperating with holding means on said wall structure at opposite sides of said said entrance opening for restraining said door against lateral outward movement when in closed position, means for moving said door rectilinearly on said hinge pin means and relative to said wall structure to a position where said door is released from the restraint of said holding means, said hinge means supporting said door in its rectilinear movement upon said hinge pin means to released position and thereafter supporting said door for swinging movement outwardly to open position at one side of said entrance opening, and means cooperating with said hinge means for holding said door in its open position.

10. In combination with the wall structure of a pressurized aircraft cabin which has an entrance opening therein, said wall structure having a generally arcuate cross-sectional configuration, said entrance opening being defined by a sill, a lintel, a generally vertical side and a spaced angularly disposed side slanting toward said sill, a door for said entrance opening, said door corresponding in peripheral outline to the peripheral outline of said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, load bearing means on said spaced sides engageable with lug means on opposite sides of said door and acting to restrain said door against lateral outward movement when in closed position, and means for moving said door rectilinearly upon said hinge pin means and relative to said wall structure to a position wherein the engaged load bearing and lug means at said slanting side are spaced apart, said hinge means supporting said door in its rectilinear movement upon said hinge pin means and thereafter supporting said door for swinging movement outwardly to one side of said entrance opening.

11. In combination with the wall structure of a pressurized aircraft cabin which has an entrance opening therein, said wall structure having a generally arcuate cross-sectional configuration, said entrance opening being defined by a sill, a lintel, a generally vertical side and a spaced angularly disposed side slanting toward said sill, a door for said entrance opening, said door corresponding in peripheral outline to the peripheral outline of said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, load bearing means on said spaced sides engageable with shear means on opposite sides of said door and acting to restrain said door against lateral outward movement when in closed position, means for moving said door rectilinearly upon said hinge pin means and relative to said wall structure to a position wherein the engaged load bearing and lug means at said slanting side are spaced apart, said hinge means supporting said door in its rectilinear movement upon said hinge pin means and thereafter supporting said door for swinging movement outwardly to one side of said entrance opening, and means cooperating with said hinge means for holding said door in its open position, said latter means comprising a pair of link members pivotally interconnected at adjacent ends, the opposite end of one of said link members being pivotally connected to said wall structure and the opposite end of the other of said link members being pivotally connected to one of said elongated hinge members.

12. In combination with the wall structure of a pressurized body which has an opening therein, a closure for said opening, said closure having a substantially wedge-shaped peripheral outline, said wall structure having a generally arcuate, cross-sectional configuration, said closure corresponding in peripheral outline to that of said opening and conforming in cross-sectional configuration to that of said wall structure, said closure having its upper edge surface lying in a substantially vertical plane, hinge means pivotally and slidably connecting said closure with said wall structure, said hinge means supporting said closure, in its movement from closed to open position, first for slidable movement relative to said wall structure and thereafter for swinging movement outwardly of said opening, handle means movably carried by said closure, and link means having pivotal connections with said handle means and with said hinge means, said link means cooperating with said handle means for effecting slidable movement of said closure.

13. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, cooperating restraining means on said door and said wall structure for preventing lateral outward movement of said door when in closed position, said hinge means supporting said door, in its movement from closed to open position, first for rectilinear movement relative to said wall structure for release of said restraining means and thereafter for swinging movement outwardly of said entrance opening, handle means movably carried by said door, and link means having a pivotal connection with said handle means and a pivotal connection with said hinge means, said link means cooperating with said handle means for effecting slidable movement of said door.

14. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, holding means at the upright side edges of said door cooperating with holding means on said wall structure at opposite side of said entrance opening for restraining said door against lateral outward movement when in closed position, said door being rectilinearly movable relative to said wall structure to a position where said door is released from the restraint of said holding means, said hinge means supporting said door in its rectilinear movement to released position and thereafter supporting said door for swinging movement outwardly of said entrance opening, handle means operatively carried by said door and movable between door-open and door-closed positions, link means having a pivotal connection with said handle means and a pivotal connection with said hinge means, said link means cooperating with said handle means for effecting rectilinear movement of said door upon movement of said handle means between its door-open and door-closed positions, and spring means operatively connected to said door and adapted to exert its bias to assist in the rectilinear movement of said door.

15. In combination with the wall structure of a pressurized aircraft cabin which has an entrance opening, said wall structure having a generally arcuate cross-sectional configuration, said entrance opening in said wall structure having a substantially wedge-shaped peripheral outline, a door corresponding in peripheral outline to said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, holding means at the upright side edges of said door cooperating with holding means on said wall structure at opposite sides of said entrance opening for restraining said door against lateral outward movement when in closed position, said hinge means supporting said door in its rectilinear movement upon said hinge pin means to released position and thereafter supporting said door for swinging movement outwardly to open position at one side of said entrance opening, handle means operatively carried by said door and movable between door-open and door-closed positions, link means having a pivotal connection with said handle means and a pivotal connection with a bracket member fixedly positioned relative to said hinge means, said link means cooperating with said handle means for effecting rectilinear movement of said door upon said hinge means upon movement of said handle means between its door-open and door-closed positions, said door being released from said holding means upon being elevated, and tension spring means connected at one end to said door and connected at its opposite end to said link means and operative to assist in movement of the door rectilinearly.

16. In combination with the wall structure of a pressurized aircraft cabin which has an entrance opening therein, said wall structure having a generally arcuate cross-sectional configuration, said entrance opening being defined by a sill, a lintel, a generally vertical side and a spaced angularly disposed side slanting toward said sill, a door for said entrance opening, said door corresponding in peripheral outline to the peripheral outline of said entrance opening and conforming in cross-sectional configuration to that of said wall structure, said door having its upper edge surface lying in a substantially vertical plane, hinge pin means fixedly carried by said door, hinge means for said door, said hinge means comprising a pair of elongated members, said members each being pivotally connected at one end to said wall structure and each having a pivotal and slidable connection at its opposite end with said hinge pin means, load bearing means on said spaced sides engageable with lug means on opposite sides of said door and acting to restrain said door against lateral outward movement when in closed position, means for moving said door rectilinearly upon said hinge pin means and relative to said wall structure to a position wherein the engaged load bearing and lug means at said slanting side are spaced apart, said hinge means supporting said door in its rectilinear movement upon said hinge pin means and thereafter supporting said door for swinging movement outwardly to one side of said entrance opening, handle means operatively carried by said door and movable between door-open and door-closed positions, link means having a pivotal connection with said handle means and a pivotal connection with a bracket member fixedly positioned relative to said hinge means, said link means cooperating with said handle means for effecting rectilinear movement of said door upon said hinge pin means upon movement of said handle means between its door-open and door-closed positions, and spring means connected at one end to said door and connected at its opposite end to said link means and operative to assist in movement of the door rectilinearly and to maintain said handle means in its door-open and door-closed positions after movement thereto.

17. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, coperating restraining means on said door and said wall structure for preventing lateral outward movement of said door when in closed position, said hinge means supporting said door, in its movement from closed to open position, first for rectilinear movement relative to said wall structure for release of said restraining means and thereafter for swinging movement outwardly of said entrance opening, handle means operatively carried by said door and movable between door open and door-closed positions, an elongated generally L-shaped link member having a pivotal connection at its shorter leg with said handle means and having its longer leg pivotally connected to a bracket member fixedly positioned relative to said hinge means, said link member cooperating with said handle means for effecting slidable movement of said door upon movement of said door between its door-open and door-closed positions, and spring means connected at one end to said door and connected at its opposite end to said link member intermediate the ends thereof and operative to assist in slidable movement of the door and adapted to be positioned by the handle means so as to exert its bias to maintain said handle means in its door-open and door-closed positions after movement thereto.

18. In combination with the wall structure of a pressurized aircraft cabin which has an entrance opening therein, a rectilinearly movable door swingable about its rectilinear axis for closing said entrance opening, said entrance opening being of a substantially wedge-shaped peripheral outline, said wall structure having a generally arcuate cross-sectional configuration, said door corresponding in size and peripheral outline to said entrance opening and conforming in cross-sectional configuration to that of said wall structure, said door having the upper edge surface thereof disposed in parallel relationship with said rectilinear axis of said door, hinge means pivotally and slidably connecting said door with said wall structure, and cooperating restraining means on said door and said wall structure for preventing lateral outward movement of said door when in closed position, said hinge means supporting said door, in its movement from closed to open position, first for rectilinear movement relative to said wall structure for release of said restraining means and thereafter for swinging movement outwardly of said entrance opening, said door when in closed position within said entrance opening having a greater area of its surface exposed to cabin pressurization to effect holding in closed position than the remaining area tending to effect slidable opening movement thereof.

References Cited in the file of this patent

UNITED STATES PATENTS

| | | |
|---|---|---|
| 166,183 | Bridge | Aug. 3, 1875 |
| 420,461 | Merriam | Feb. 4, 1890 |
| 478,748 | Grosh | July 12, 1892 |
| 1,202,068 | Juruick | Oct. 24, 1916 |
| 1,775,681 | Marino | Sept. 16, 1930 |
| 2,395,852 | Custer | Mar. 5, 1946 |
| 2,564,988 | Muller | Aug. 21, 1951 |
| 2,751,636 | Heinemann et al. | June 26, 1956 |
| 2,780,384 | Stratton et al. | Feb. 5, 1957 |
| 2,832,553 | Wallenhorst | Apr. 29, 1958 |

FOREIGN PATENTS

| | | |
|---|---|---|
| 179,172 | Germany | Nov. 29, 1906 |
| 452,679 | Great Britain | of 1936 |
| 979,525 | France | Dec. 13, 1950 |
| 308,230 | Switzerland | Sept. 16, 1955 |